United States Patent
Tishman

[15] 3,654,619
[45] Apr. 4, 1972

[54] AUDIO-VISUAL INSTRUCTIONAL SYSTEM WITH SYNCHRONIZED VISUAL AND AUDIO PRESENTATIONS

[72] Inventor: Abraham Tishman, Greenbelt, Md.
[73] Assignee: Dynamic Typing, Inc., Washington, D.C.
[22] Filed: Dec. 20, 1968
[21] Appl. No.: 785,600

[52] U.S. Cl. ..................................................340/172.5, 35/6
[51] Int. Cl. ......................................................G09b 13/02
[58] Field of Search ..................340/172.5, 324, 334, 366; 235/157; 35/6, 8, 35 C; 40/28.1; 178/5.6; 179/100.1; 346/33, 44; 352/17; 353/15

[56] References Cited

UNITED STATES PATENTS

| | | | |
|---|---|---|---|
| 2,780,679 | 2/1957 | Vandivere, Jr. | 340/172.5 X |
| 2,985,069 | 5/1961 | Sampson | 353/15 |
| 3,245,156 | 4/1966 | De Bloois et al. | 35/8 |
| 3,340,524 | 9/1967 | Rinaldi | 340/324 |
| 3,414,985 | 12/1968 | Ashley | 35/8 |

*Primary Examiner*—Raulfe B. Zache
*Assistant Examiner*—Melvin B. Chapnick
*Attorney*—Oberlin, Maky, Donnelly & Renner

[57] ABSTRACT

An audio-visual instructional system wherein the student or trainee is simultaneously subjected to synchronized visual and audio presentations for conditioning the trainee by utilizing both sensory perceptions. The system includes a visual display which is actuated by a memory device which is in turn actuated by a control signal of a signal reproducing means.

18 Claims, 4 Drawing Figures

Patented April 4, 1972

INVENTOR
ABRAHAM TISHMAN

BY Oberlin, Maky, Donnelly & Renner
ATTORNEYS

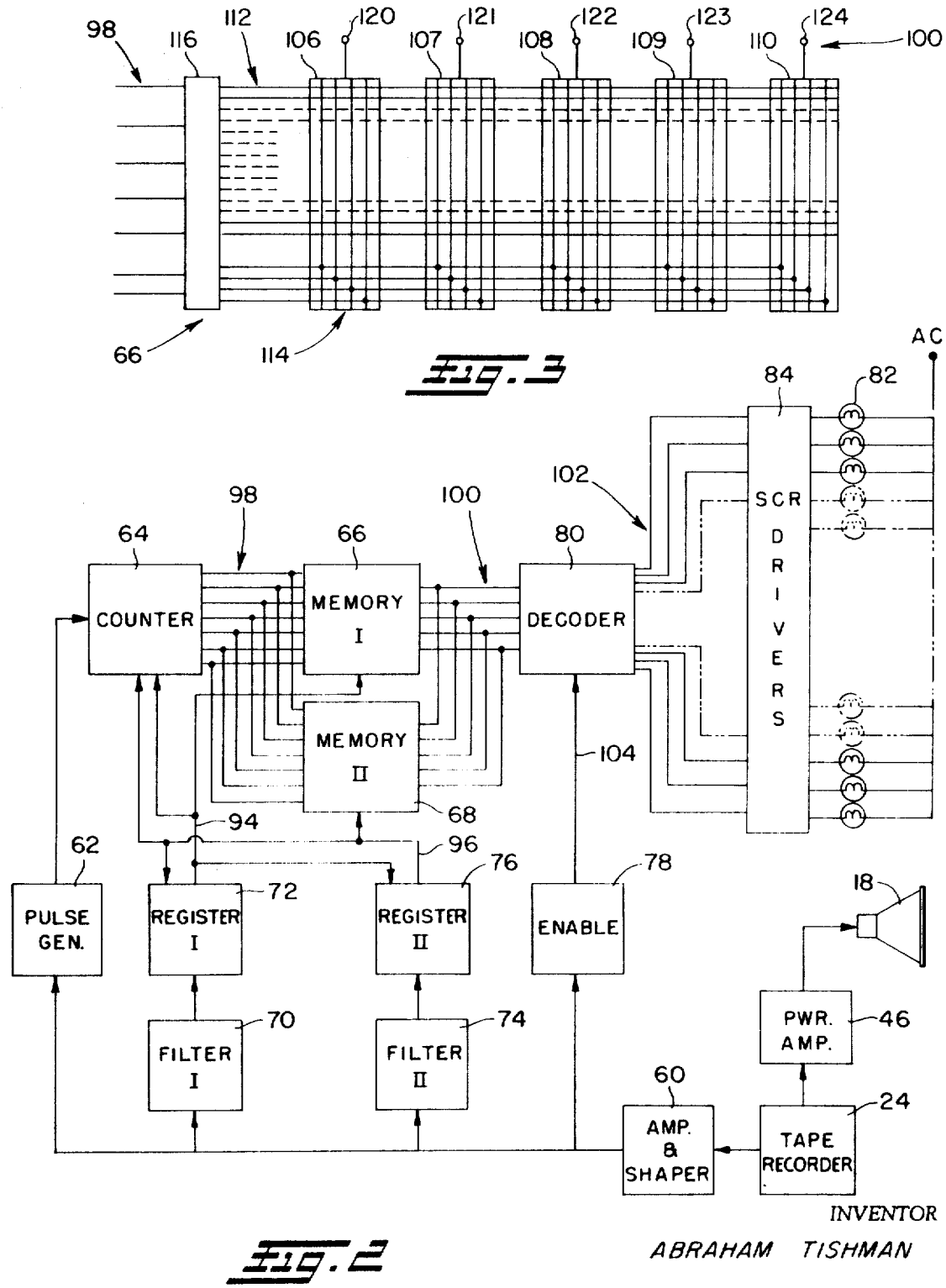

3,654,619

AUDIO-VISUAL INSTRUCTIONAL SYSTEM WITH SYNCHRONIZED VISUAL AND AUDIO PRESENTATIONS

BACKGROUND OF THE INVENTION

The present invention relates as indicated to an audio-visual instructional system, with the term "instructional" as used herein being employed in its broadest sense to include systems primarily intended to facilitate the learning process, for example, in a typical classroom environment supplementing teacher instruction, or in a system designed primarily to condition the trainee, that is, to increase the reflex action of the trainee. An example of a conditioning type system is the training or teaching of keyboard instruments, such as typewriters, such system having the capability of accomplishing such training without the presence of a teacher or instructor. It should be understood, and it will become apparent hereinbelow, that the system of the present invention has direct application to both systems described, and to practically any environment where synchronous audio and visual presentation is desired.

It has long been recognized that the learning or training process can be significantly enhanced by audio or visual aids. A common audio teaching aid comprises programmed magnetic tapes on which are carried entire programs which are delivered to the trainees on playback, either through a central loudspeaker or through individual headphones used by each trainee. Known visual aids include movie or slide projecting devices or, for keyboard instruments, suitable display boards. For typewriter training, a known display board is in the form of a replica of a typewriter keyboard, with the board being wired for predetermined actuation, in accordance with the lesson, to illuminate individual letters or symbols on the replica keyboard individually and in sequence, according to the particular lesson.

Training systems for keyboard instruments have been developed which synchronously present both visual and audio lesson segments to the trainee thereby making more effective the training process. However, heretofore, these synchronous visual and audio systems have normally employed magnetic tape for producing both the audio and the visual presentations. A conventional two-track magnetic tape is used, one track being adapted to carry the audio portion of the program, and the second track comprising a signal track adapted to carry impulse signals for actuating synchronously the visual aid. The signal track must necessarily carry impulse signals that are capable of discriminating actuation of the visual aid so that the visual presentation is synchronous with the audio track, with such discrimination being accomplished by providing a different frequency tone for every letter or symbol to be contained in the lesson. As a result, programming the visual presentation is more difficult and the varying frequency requirements are a practical deterrent on the number of letters or symbols contained in a particular lesson. This limitation is particularly significant in the teaching of instruments having a great many more letters, symbols or the like than a conventional typewriter.

In present magnetic tape systems, size and cost have been serious detractions. The cost per installation has been relatively high, and the size of the equipment has dictated, for esthetic reasons, the location of the visual display apart from the other system components.

SUMMARY OF THE INVENTION

A primary object of the present invention is to provide an audio-visual instructional system wherein the student or trainee is subjected simultaneously to synchronized audio and visual presentations.

A further, more specific object of the present invention is to provide such a system utilizing a magnetic tape for presentation of the audio portion of the lesson and a memory device for actuating synchronously the visual display. In accordance with the invention, the programmed memory device is actuated by a signal from the signal track of the reproducing means, for example, a magnetic tape recorder, with the memory device in turn actuating the visual display to achieve the simultaneous presentation. The system includes means for decoding the memory input and output signals, and further includes means for selecting the proper memory, where more than one memory is present in the system, and disabling the other memories.

Another object of the present invention is to provide a system which is adapted to be contained entirely within the visual display, thereby to provide an esthetically attractive design.

Still another object of the present invention is to provide a self-contained system as described which is unusually light in weight thereby to facilitate handling and installation thereof.

Yet another object of the present invention is to provide a system which is simple to operate. As noted, the system is self-contained, and the system is conditioned for operation by plugging the power cord into a conventional wall outlet.

A still further object of the invention is to provide a system of the type described that can be manufactured at relatively low cost and which is substantially devoid of maintenance problems.

A further object of the invention is to provide a system that does not require an actuating code, after the initial frequency tone has selected the desired memory.

Reference is now made to the application drawings, in which:

BRIEF DESCRIPTION OF THE DRAWINGS

FIG. 3 is a schematic drawing of the memory portion of the system, and

FIG. 4 is a schematic drawing of the preferred recording and reproducing means of the invention.

DESCRIPTION OF THE PREFERRED EMBODIMENT

Figure 1:
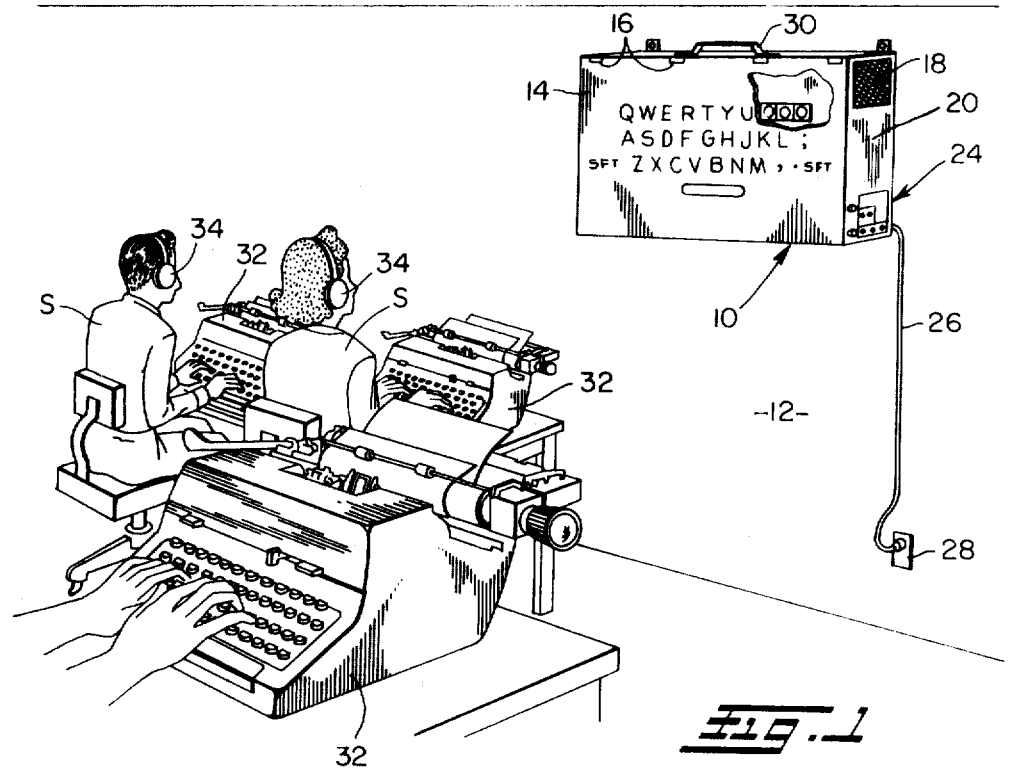
FIG. 1 is a perspective view of a typical installation of the present invention, showing two trainees receiving the synchronized audio and visual presentation.

Referring now in more detail to the drawings, wherein like parts are indicated by like reference numerals, and initially to FIG. 1, there is illustrated therein a typical installation of the system of the present invention, with the entire system being contained within a housing generally indicated at 10 adapted to be suspended or otherwise mounted on wall 12. As shown, the housing 10 is mounted at a suitable height to afford optimum viewing thereof by the students or trainees S.

A display panel 14 is mounted at the front of the housing 10, with the panel preferably being mounted for movement relative to the housing, for example, by means of hinges 16, to permit the panel to be swung upwardly to obtain access to the interior of the housing and the system components.

A pair of speakers 18, only one of which is visible in FIG. 1, are mounted in the respective sidewalls 20 of the housing, and a tape recorder generally indicated at 24 is mounted in one of the sidewalls 20 relatively adjacent the bottom thereof, with the top and front of the recorder being exposed exteriorly of the housing to facilitate installation and removal of the tape cassettes from the recorder. The tape recorder is preferably of conventional construction, and can be purchased commercially from any number of suppliers. A power cord 26 is provided which in the form shown extends from sidewall 20 and is adapted to be plugged into a conventional wall outlet, as shown at 28, for operating the system. A carrying handle 30 is mounted on the top wall of the housing 10 to facilitate handling of the same. The housing 10 is preferably made of light weight material, for example aluminum, thereby greatly facilitating shipping and installation of the system. In addition, the entire system is self-contained in the housing 10 and can be conditioned for operation simply by connecting the cord to a wall outlet.

Each student or trainee S is provided with a typewriter commonly designated at 32. Although the audio could be supplied entirely through the speakers 18, each student may if desired be provided with a set of headphones commonly designated at 34 to receive the audio portion of the lesson. As noted above and as will be pointed out in more detail hereinbelow, the audio lesson is synchronized with the visual presentation which, for typewriter training, comprises narrative instruction synchronized with predetermined actuation of the visual display.

In the form shown, the panel 14 represents the keyboard of a typewriter and is, in fact, an exact replica of the same. Each letter or symbol contained on the typewriter keyboard is likewise shown on the panel 14. Each symbol on the panel 14 has associated therewith illuminating means, such as a lamp or bulb, for illuminating the letter or symbol, as programmed and synchronized with the lesson narrative. For example, the student may be instructed to type "a" at the same time the letter "a" is illuminated on the panel 14.

It should be clearly understood that the illustrated environment represents but one of many uses of the present invention. The system is adaptable to the training of essentially all types of keyboard instruments, such as organs, pianos and the like, or practically any learning or conditioning environment where simultaneous audio and visual presentations are feasible for optimum teaching results. Thus, the basic concept of the system is well suited for typical classroom use where a particular lesson can be more effectively presented by simultaneous audio and visual means.

Referring to FIG. 4, the tape recorder 24 is provided with two separate tape tracks schematically represented at 36 and 38. Track 38 is adapted to carry the audio, and track 36 is adapted to carry the signals by which the memory of the system is actuated. These signals can be placed on track 36 in any suitable known manner, for example, by an oscillator 40, and are in the form of tones, which may or may not be at the same frequency, as will be later discussed. The signals are placed on track 36 so as to synchronize the visual display with the narrative carried on the audio track 38. Separate playback heads 42 and 44 are provided, with amplifier 46 amplifying the audio signal received from the reproducing head 44 for application to the speakers 18. The amplifier 48 comprises a recording amplifier associated with a microphone 50. Separate recording heads 52 and 54 are preferably provided for preparing the tape, in known manner, head 54 being connected to the recording amplifier 48 and head 52 receiving keying or cue signals from the oscillator 40.

Although the preferred embodiment of the invention employs a two-track magnetic tape recorder as described, it will be apparent that comparable recording equipment can alternatively be used. For example, a disc or record having two channels could be used to carry synchronously the audio and cue signals for the visual display. A further alternative is to employ a single track tape where the cue signal is impressed on the audio presentation. The important characteristic of the recording means is that it effects in part the synchronization between the audio and visual presentation.

Figure 2:
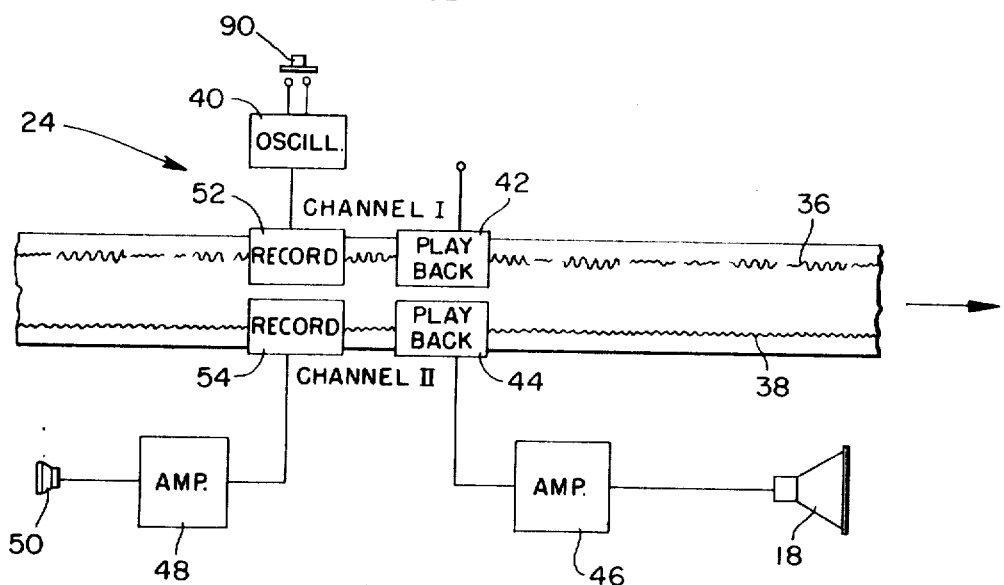
FIG. 2 is a schematic drawing, partially in block diagram form, of the system.

Referring now to FIG. 2, the system of the present invention is shown therein in schematic diagram form. As above described, the audio circuit comprises tape recorder 24, amplifier 46, and the speakers 18. Referring to the signal or control circuit, the tones carried by the signal track of the tape recorder are channelled to an amplifier and shaper 60, with the signal emanating from the amplifier and shaper 60 being fed in one direction through pulse generator 62 and counter 64 to memory units 66 and 68, with the amplified signal also leading to the memory unit 66 selectively through filter 70 and register 72, or to memory unit 68 through filter 74 and register 76.

The elements just described per se form no part of the present invention, and are essentially readily available commercial items. For example, the amplifier and shaper 60 functions to shape the signal and produces the pulse, and comprises a commercially available band pass filter and an amplifier. The pulse generator 62 can be purchased from Fairchild Semiconductor, Mountain View, Calif., with this part being identified as Fairchild No. 9601. Similarly, the counter 64 is identified by Fairchild Semiconductor as part No. 7493, and the memory units 66 and 68 are also items sold by Fairchild and identified by No. 3501. The filter 70 likewise is a commercial item readily available to those skilled in the art. The register 72 is a product of Fairchild Semiconductor indentified by part No. 9001. The same applies to register 76, and filter 54 is a conventional component like filter 70.

The amplified signal is also sent through enable unit 78 to decoder 80. The output of the memory units 66 and 68, whichever is selected, is directed to decoder 80, with the decoded signal selectively actuating the lamps commonly designated at 82 housed within the display panel 14 and associated with each letter or symbol on the display panel, as above described. The output signal from the decoder passes through a series of SCR drivers schematically shown at 84, before passage to the selected lamp 82 for lighting the same. In known manner, the SCR drivers function, when triggered, is to provide an output signal to the lamps.

The components mentioned in the preceeding paragraph likewise do not per se form part of the present invention. The decoder 80 can be purchased from Fairchild Semiconductor, and is identified as part No. 9311. Although the enable circuit 78 can be separately constructed and integrated into the circuit, it preferably is supplied as part of the decoder 80. The SCR drivers 84 are readily available from numerous suppliers, and can be purchased from General Electric, for example, by part No. C106B1.

It will be noted that two memory units 66 and 68 are shown in the FIG. 2 diagram. The number of memory units actually employed in the memory system depends upon the particular lesson or lessons. A lesson which is relatively short, thus requiring relatively fewer cue signals, will correspondingly require a memory of somewhat smaller capacity. On the other hand, where the lesson is relatively long, numerous memory units of the type shown at 66 and 68 may be required to provide the required memory capacity. It will thus be understood that, for a memory circuit of relatively large capacity, the components and arrangement thereof of such larger circuit would be essentially duplicative of those shown in FIG. 2.

Generally described, the memory circuit of the present invention operates as follows. The first tone carried by the signal track 36 of the recorder 24 is at a predetermined frequency and functions at the beginning of the lesson to reset the counter 64 and to select one particular memory while at the same time disabling other memories which may comprise the total memory circuit. For example, if the system is programmed to carry five separate and distinct lessons, these lessons may be distinguished one from the other in the memory circuit by the frequency of the tone carried by the signal track of the magnetic tape at the beginning of the lesson chosen. Once the lesson is chosen, the frequency of the tone may vary within wide limits, outside the actuating frequencies of the selected and the disabled memories, to sequence or step the counter, interrogate the memory unit chosen and to actuate in sequenced manner the display panel 14.

The memory devices are chosen or disabled by means of filter 70, 74 etc. Each filter is designed to pass a signal of a predetermined frequency, and to block passage of signals of other frequencies. For example, to actuate memory 66, a tone of the operating frequency of the filter 70 associated with such memory is fed to such filter, and then to the register 72 to enable memory unit 66 associated therewith. The remaining filters, which are designed for different frequencies, do not pass the signal tone, so as to in effect disable the other memories.

Once the particular memory is chosen, each succeeding tone burst is carried on the signal track 36 at a frequency different than the frequency of the initial tone, steps or sequences the counter 64 which in turn sequentially interrogates the selected memory 66 or 68, each of which is preprogrammed to provide in sequence the letters or symbols in synchronization with the narrative carried on the audio tape track 38.

The memory output signal is directed to the decoder 80 from which it passes through the SCR driver unit 84 to the selected lamp 82.

As previously noted, the recorder 24 comprises magnetic playback and recording heads 42, 44 and 52, 54, respectively, which are schematically shown in FIG. 4. Oscillator 40 is capable of providing tones of any particular frequency in well known manner. The oscillator 40 is actuated by pushbutton 90 for application to the recording head 52 thereby programming the signal track 36 of the tape. The audio and signal tracks are preferably programmed simultaneously, with pushbutton 90 being depressed to synchronize the signal with the audio portion of the lesson. The memory is selected by the frequency of the tone first appearing on the signal track, with subsequent signal tones not being critical to frequency consideration other than to be outside the frequency tones which actuate the selected or disabled memories. The duration of the tone on the signal track 36 controls the interval of lighting of the lamps 82, which controlled and variable duration provides an important teaching technique.

When switching from one frequency tone to another, as controlled by oscillator 40, a different memory 66 or 68 will be selected through the associated filter element, and counter 64 will be reset to interrogate the memory from an initial condition.

The amplifier and shaper circuit 60 is of conventional design and serves merely to exclude variations in the signal and provide a suitable signal for application to the pulse generator 62, filters 70, 74 and enable circuit 78.

Filters 70 and 74 comprise a vibrating reed type filter characterized by extremely high selectivity and which may provide a plurality of separate output channels in an extremely small package suitable for application in portable apparatus of this type.

Registers 72, 76 may comprise independent flip-flop units and are considered triggered to the "on" state when an appropriate tone has been received through the respective filters 70, 74. The outputs of the registers 72, 76 provide a conditioning signal on lines 94, 96 respectively, each line being connected to a memory unit 66 or 68, the counter 64 for reset purposes, and the other registers, not activated by the tone, also for reset purposes. The conditioning signals on lines 94, 96 enable the respective memories 66, 68 such that because of the parallel input and output connections of the memories, only one will provide a utilizable output signal for application to decoder 80. It will be noted that subsequent tone bursts should not be of the same frequency, which condition would cause constant resetting of the counter 64. With this limitation, succeeding tones on the signal track 36 of the tape may be of other selected frequencies for stepping the counter 64. Pulse generator 62 is a conventional circuit which is suitable to convert the tone burst from the amplifier and shaper circuit 60 into a single pulse for application to the counter 64.

Most of the circuit components are of well-known design and need not be described in detail for a full understanding of the invention. Thus, counter 64 may be a conventional flip-flop type counter providing an output in standard binary code on seven output lines indicated generally at 98, reference being made to FIG. 3. The single count change of the counter 64 occurs from the application of a pulse from the generator 62, while the counter 64 is reset to its initial condition by receipt of signals from lines 94 and 96. Similarly, the decoder 80 is of well-known design comprising a logic circuit to decode a binary code applied on five input lines indicated generally at 100 representing the output of either memory circuit 66, 68 and activating one of the output lines indicated generally at 102 from the decoder, Fig. 2, in this instance, consisting of 32 separate lines representing the possible combinations of the input to the SCR drivers. The SCR drivers 83 comprise individual silicon controlled rectifiers, one for each output line 102 and corresponding indicator lamp 82, with each SCR being energized by the signal applied at the lines 102 to the gate electrode of the SCR and being commutated by an AC power source (not shown) for energizing the lamps 82. Thus, when memory 66, for example, is selected by means of an appropriate tone passed through filter 70 to condition register 72, succeeding tone bursts will step counter 64 through its count capacity to interrogate memory 66 and sequentially energize lamps 82. The time of energization of lamp 82 is determined by the length of the tone burst on the tape as enable circuit 78 provides a signal on line 104 for allowing decoder 80 to energize a lamp so long as the tone is present. The absence of a signal on line 104 inhibits the output of the decoder 80 and thus precludes actuation of a lamp 82.

Memory units 66, 68 are preferably read-only memories, programmed during fabrication to provide predetermined information. Memory 66 is shown in greater detail in FIG. 3 in block diagram form and comprises a 32 by 32 bit matrix which is subdivided into eight 32 by four bit sub-matrices of which only five are used in this application and are indicated by reference numerals 106–110. Each sub-matrix 106–110 is an independent read-only memory with common addressing inputs comprising 32 horizontal rows indicated at 112 and four vertical columns indicated generally at 114. By means of a decoding circuit 116 contained within the memory 66 the code presented on lines 98 is converted to select one of the rows 112 and one of the columns 114 thereby addressing one bit position in each sub-matrix 106–110 where each is located at the interception of the horizontal and vertical lines. Each sub-matrix 106–110 is provided with a single output connection indicated at 120–124 all of which are connected to or comprise the output lines 100 applied to decoder 80. Thus, the output on connection 120, for example, is one of 128 bits contained within sub-matrix 106 and selected by lines 112, 114. Therefore a five bit output word is supplied to decoder 80 for conversion to energization of a single line 102 and a single indicator lamp 82.

It will be apparent to those skilled in the art that this preprogrammed form of memory is eminently suitable for application in a system where a program of instruction must be developed and supplied to a plurality of locations. Other types of memories could be utilized as well wherein it may be desired to have the versatility of varying the stored program, but significant additional circuitry would be required and the economies of this system would then not be realized.

It will thus be seen that the objects of the invention have been realized. A synchronized audio-visual system has been provided which is entirely self-contained within the housing mounting the visual display. The lesson or lessons are programmed on one or more memory storage units that are selectively energized by the signal track of the recorder by a signal tone of a selected frequency. Except for the initial tone, which actuates a particular memory and disables the other memories, each memory can be sequenced and interrogated without a code, which is a distinct advantage in programming the lesson or lessons. The system can be conditioned for operation simply by connecting the power cord to a wall outlet, and is reliable and substantially free of maintenance problems.

I claim:

1. An audio-visual instructional system comprising reproducing means for providing audio and control signals representative of audio and control functions, a memory unit composed of a plurality of storage devices each containing a predetermined program of information and adapted to present such program in sequential order, first means responsive to said audio signals for providing an audio output, second means responsive to said control signals for electronically sequencing and interrogating said memory unit, a plurality of filters each of which is designed to pass a signal of a predetermined frequency for exclusively selecting one of said storage devices, means for synchronizing such audio output and such memory interrogation, and means responsive to said memory unit for visually displaying the program stored therein thereby to provide a simultaneous audio and visual presentation.

2. The system of claim 1 wherein said reproducing means comprises a magnetic tape recorder having separate audio and signal tracks.

3. The system of claim 1, wherein said second means comprises a counter unit for sequentially stepping said memory unit.

4. The system of claim 1 wherein said visual display means comprises a housing having a front panel provided with pictorial representations of the subject-matter forming part of said program.

5. The system of claim 4 wherein all of the system components are contained within said housing.

6. The system of claim 1 wherein said control signals are of variable duration and said display means is responsive to said control signals to vary the interval of display.

7. An audio visual instructional system comprising reproducing means providing audio and control signals representative of audio and control functions, a plurality of memory units each of which contains a predetermined program and is adapted to present such program in sequential order, means responsive to the said audio signals for providing an audio output, means responsive to said control signals for exclusively selecting one of said memory units and disabling the others, means for electronically sequencing and interrogating said selected memory unit, means for synchronizing such audio output and such memory interrogation, and means responsive to said selected memory unit for visually displaying the program stored therein thereby to provide a simultaneous audio and visual presentation.

8. The system of claim 7 wherein said means for exclusively selecting one of said memory units comprises a plurality of filters each of which is designed to pass a signal of a predetermined frequency.

9. The system of claim 7 wherein said reproducing means comprises a magnetic tape recorder having separate audio and signal tracks.

10. The system of claim 7 wherein said visual display means comprises a housing having a front panel provided with pictorial representations of the subject matter forming part of said selected program, means within said housing for illuminating said representations, said illuminating means being actuated by said memory device synchronously with said audio output.

11. The system of claim 7 wherein said means responsive to said control signals comprises a counter for sequencing said selected memory unit, said selected memory unit being interrogated in response to such sequencing to supply an output signal to a decoder means, said decoder means converting said output signal and passing the converted signal to illuminating means for illuminating a pictorial representation on said visual display means synchronously with an audio presentation.

12. An audio visual instructional system comprising a tape recorder having dual record and playback channels for providing simultaneous audio signals and control signals, a display panel in the form of a replica of a keyboard instrument and containing letters and symbols representing such keyboard, a read-only memory programmed in predetermined codes, an array of indicator lamps arranged in a configuration coincidental with the letters or symbols of said replica keyboard, said array adapted to display the converted code of said memory as discrete indications, a decoder for decoding each code of said memory to actuation of a single lamp in said array, said decoder being operative in response to a control signal of said tape recorder, and a counter connected to said memory for selecting the codes from said memory in a predetermined sequence, said counter being responsive to a control signal of said tape recorder, said control signals comprising tone bursts of preselected duration for sequencing said counter and for actuating said decoder and thus a single lamp in said array for such preselected durations.

13. The system of claim 12 wherein said memory comprises a plurality of memory units, each containing predetermined codes, said system connected in parallel, and further including tone filters associated with each of said memory units for energizing same and for resetting said counter in response to the different tone control signals.

14. The system of claim 13 wherein each of said tone filters includes a register for recording the first burst of tone of a preselected frequency, said register being operative to reset said counter and maintain said associated memory unit in a read-out condition.

15. The system of claim 14 wherein said counter is adapted to provide a sequence of output signals in binary code and said memory units comprise a decoding portion which decodes said binary code for selecting individual row and column matrix lines in a plurality of sub-matrices of said memory units to provide an output signal in binary code format.

16. The system as set forth in claim 15 wherein said decoder is adapted to decode binary code to selection of one of a plurality of lines and includes an enable circuit responsive to the length of tone burst of the control signal whose function is to enable the output of the decoder.

17. The system as set forth in claim 16 wherein said memory units are read-only storage units having a predetermined code pattern stored therein during fabrication.

18. The system as set forth in claim 17 further including an SCR driver circuit for each indicator lamp of said array, the SCR of each circuit being triggered from a separate output line of said decoder to illuminate the respective lamp, with no more than one SCR being triggered at one time, and said circuits being energized by an AC source of power commutation of the last triggered SCR occurs in each cycle to extinguish the lamp in the absence of an output from said decoder.

* * * * *